Nov. 28, 1933.  C. A. RUESENBERG ET AL  1,936,884
FREEWHEELING UNIT
Filed March 9, 1931   3 Sheets-Sheet 1

Inventors:
Carl A. Ruesenberg.
William F. Hughes.
By Charles Orsfield Attys

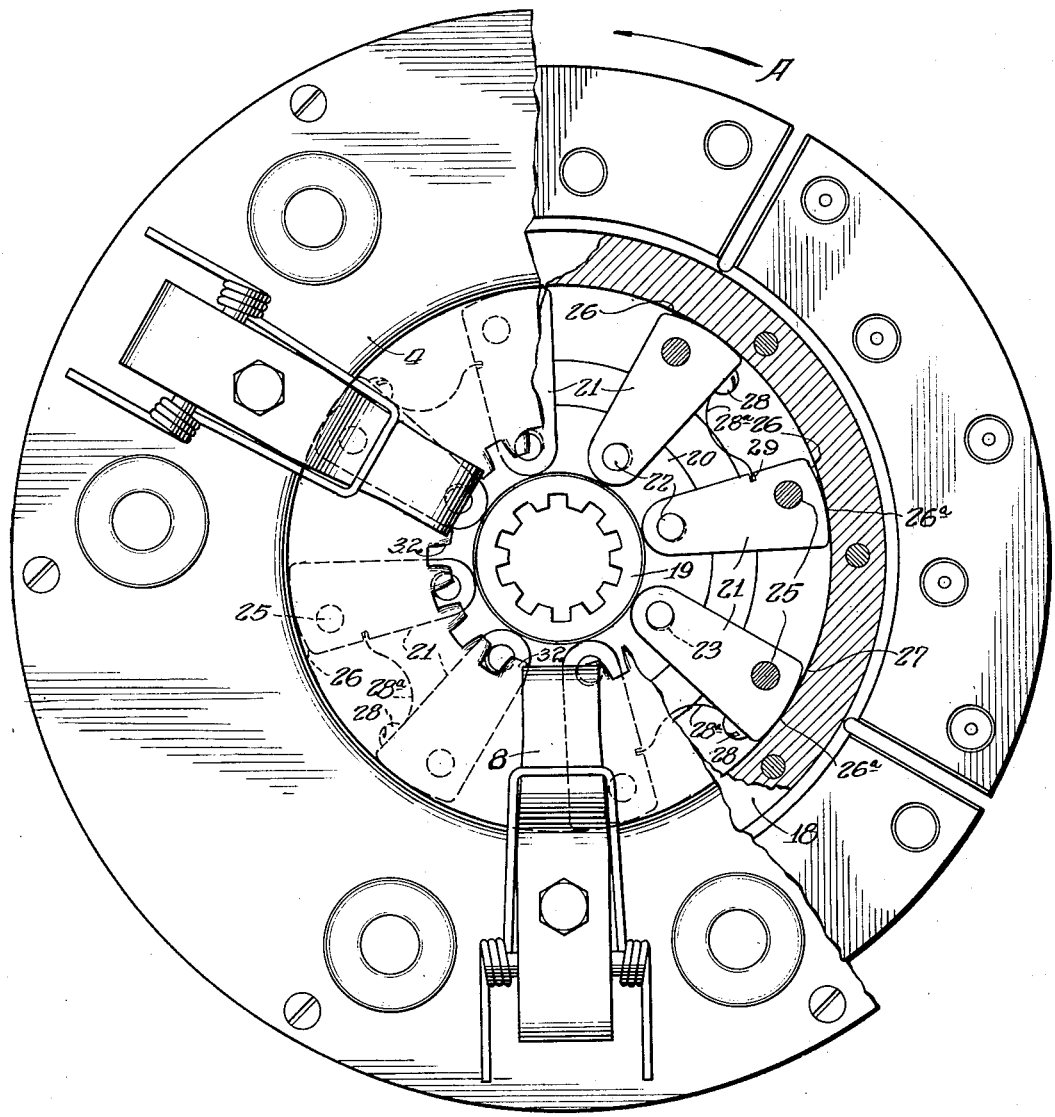

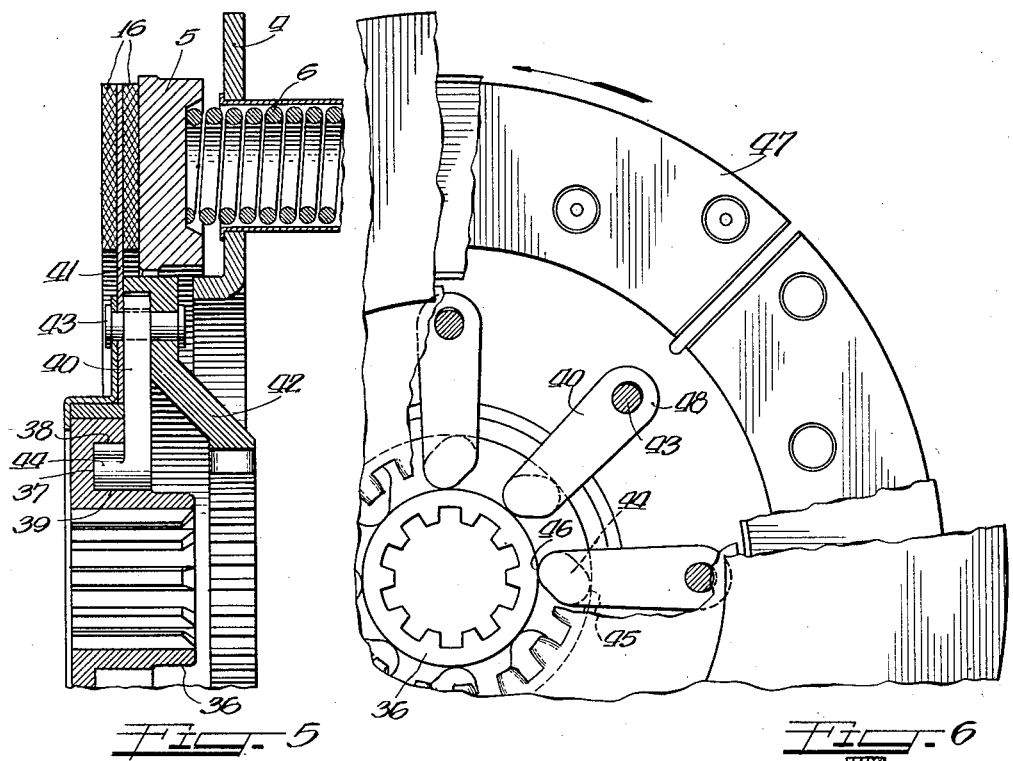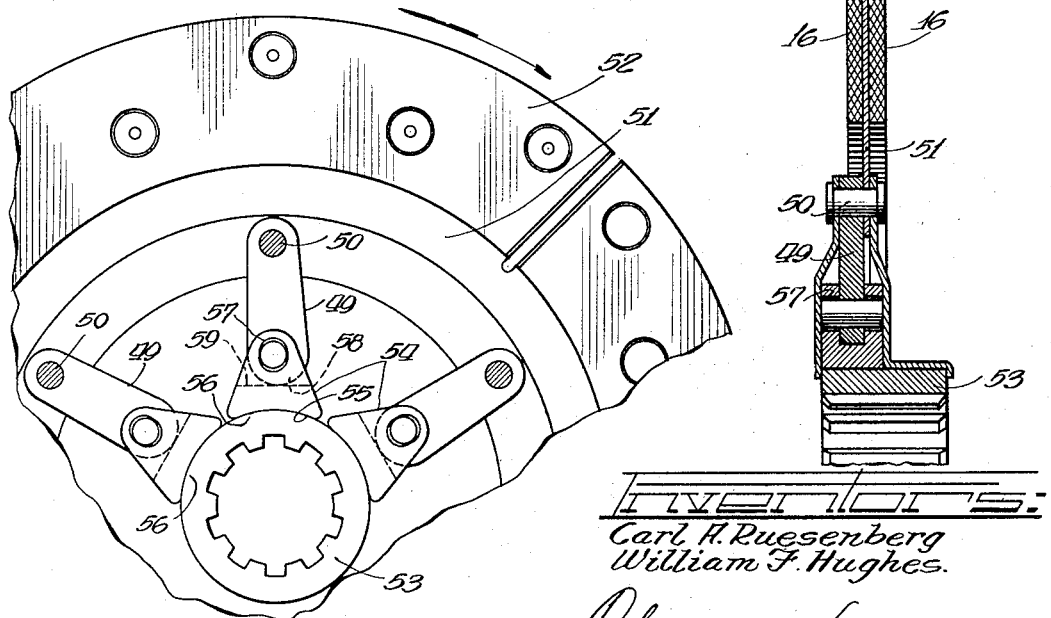

Patented Nov. 28, 1933

1,936,884

UNITED STATES PATENT OFFICE 1,936,884

FREEWHEELING UNIT

Carl A. Ruesenberg and William F. Hughes, Rockford, Ill., assignors to Rockford Drilling Machine Company, Rockford, Ill., a corporation of Illinois Application March 9, 1931. Serial No. 521,088

12 Claims. (Cl. 192—48)

This invention relates to motor vehicle transmissions, and has generally to do with a free wheeling clutch and lockout mechanism.

A number of cars of well known make are now on the road with operating mechanism embodying the principle of free wheeling, that is, wherein the vehicle may proceed by virtue of its own momentum independently of the engine, so that the latter will not act as a brake. Means for locking out the free wheeling mechanism so that the engine will act as a brake is also provided.

Due to the fact that the lock out feature of free wheeling constructions now generally in vogue is located either at some point intermediate the vehicle propelling shaft, or at least a substantial distance from the clutch, it will be evident that upon locking out, the portion of the shaft between the clutch and the lock out construction will be subject to a sudden and severe torque, accompanied by great vibration. Repeated shocks of this character have a tendency to crystallize the metal of the shaft and finally break down the same. This is caused by the fact that while the car is free wheeling the differential shaft is rotating at a much higher rate of speed than the engine shaft, and, in locking out the free wheeling, a direct drive is set up between these two shafts so that the engine may serve as a brake to slow down the car. This is moreover quite annoying to the occupants of the vehicle.

A further objection to free wheeling mechanisms as now constructed, especially in regard to the lock out feature, resides in the fact that an operation by the hand of the driver is necessary in order to actuate the same. This is not only annoying but is also inconvenient for the driver, and since it usually becomes necessary to lock out the free wheeling mechanism and employ the engine as a brake in a very small space of time, as in an emergency, the driver is hard pressed to handle the car properly without thus additionally exerting himself.

It is accordingly one of the principal objects of the present invention to provide a free wheel mechanism embodying a lock out device of such construction that, in the actuation of the same, the resultant torsional stress on the associated parts will be practically negligible.

A further object of the invention is to provide means, embodied in a free wheel construction, by which it is possible to actuate the lock out device by a normal operation of the driver.

Free wheeling constructions of the character generally in use employ roller or spring clutches to provide the one-way or overrunning drive. Spring clutches are more or less unsatisfactory for the reason that undesired slipping sometimes occurs and accurate machining of parts is necessary. Roller clutches also require very accurate work to insure that all rollers will grip and be released simultaneously.

It is accordingly a further object of the present invention to provide an improved overrunning clutch involving very little accurate machine work, yet which will positively grip for the one-way drive and will slip easily for the relative motion of the clutch parts, requiring a low cost of manufacture and little time for assembly.

A further object of the present invention is to provide a free wheeling clutch unit which is so arranged that it may cooperate with any change speed mechanism, conventional or otherwise, without in the least reorganizing the latter.

Further objects and advantages of the present invention will appear as the description proceeds.

In carrying out the invention, we avail ourselves of any suitable flywheel and associated back and pressure plate construction for cooperation with the clutch facings. A disc is riveted to the clutch plate and concentric therewith and is provided with a flange surrounding the hub of the clutch plate. Special cam means cooperate with the clutch plate and disc to provide an overrunning or free wheeling unit. The disc has a central toothed opening substantially larger than the usual spline shaft passing through the same. The usual slidable splined sleeve adapted to actuate clutch retracting or disengaging mechanism is, for the purposes of the present invention, provided with an extension having external teeth adapted to interfit with the internal teeth on the disc. The ends of the teeth are preferably formed to facilitate engagement. As long as these sets of teeth are out of engagement, the engine can drive the car through the medium of the cam elements aforesaid, and the vehicle can free wheel due to the lost motion or overrunning connection set up by the cam means. However, when it is desired to lock out the lost motion connection, the sets of teeth aforesaid are interlocked in response to pressure applied by the foot on the clutch pedal, and the parts are so arranged that these sets of teeth may be interlocked without disengaging the clutch itself, the pedal being moved merely a sufficient amount to take up the usual play in the pedal.

It will be appreciated that the natural thing to do when it is desired to slow down the car is to depress the brake pedal, so that the action of the foot operated brake will serve to reduce the difference in speed of rotation of the crank shaft and splined shaft, thereby reducing any tendency of the interlocking teeth 33 to clash. As long as the clutch operating foot is held in position just prior to retraction or disengagement of the engine clutch, and even during the initial disengagement of the clutch, if the foot is pushed a little forward of this position, the engine will act as a brake, providing, of course, that the car is in gear. When the clutch pedal is fully depressed, the clutch is entirely disengaged, and the splined sleeve with its external teeth will have been moved to such a position that the sets of teeth are in disengagement. Upon release of the clutch pedal to cause the clutch to again be engaged, the usual clutch pedal retracting spring (not shown) will withdraw the sleeve and cause the teeth thereon to pass through and beyond the teeth on the disc, which is the driving member of the overrunning clutch. The lock out parts are located close to the clutch itself so that no appreciable distortion of the spline shaft or any other part associated therewith can occur when the overrunning mechanism is locked out.

On the drawings:

Figure 2 is an end view of the construction appearing in Figure 1, viewed from the right, partly broken away to show the inner construction, and certain parts being omitted.

Figure 3 is a fragmentary view similar to Figure 2, but showing a modified form of free wheeling clutch.

Figure 4 is a sectional view of the construction shown in Figure 3, certain parts being shown in elevation.

Figure 5 is a view similar to Figure 3, but showing a further modified form of free wheeling clutch.

Figure 6 is a sectional view of the construction shown in Figure 5.

Figure 1:
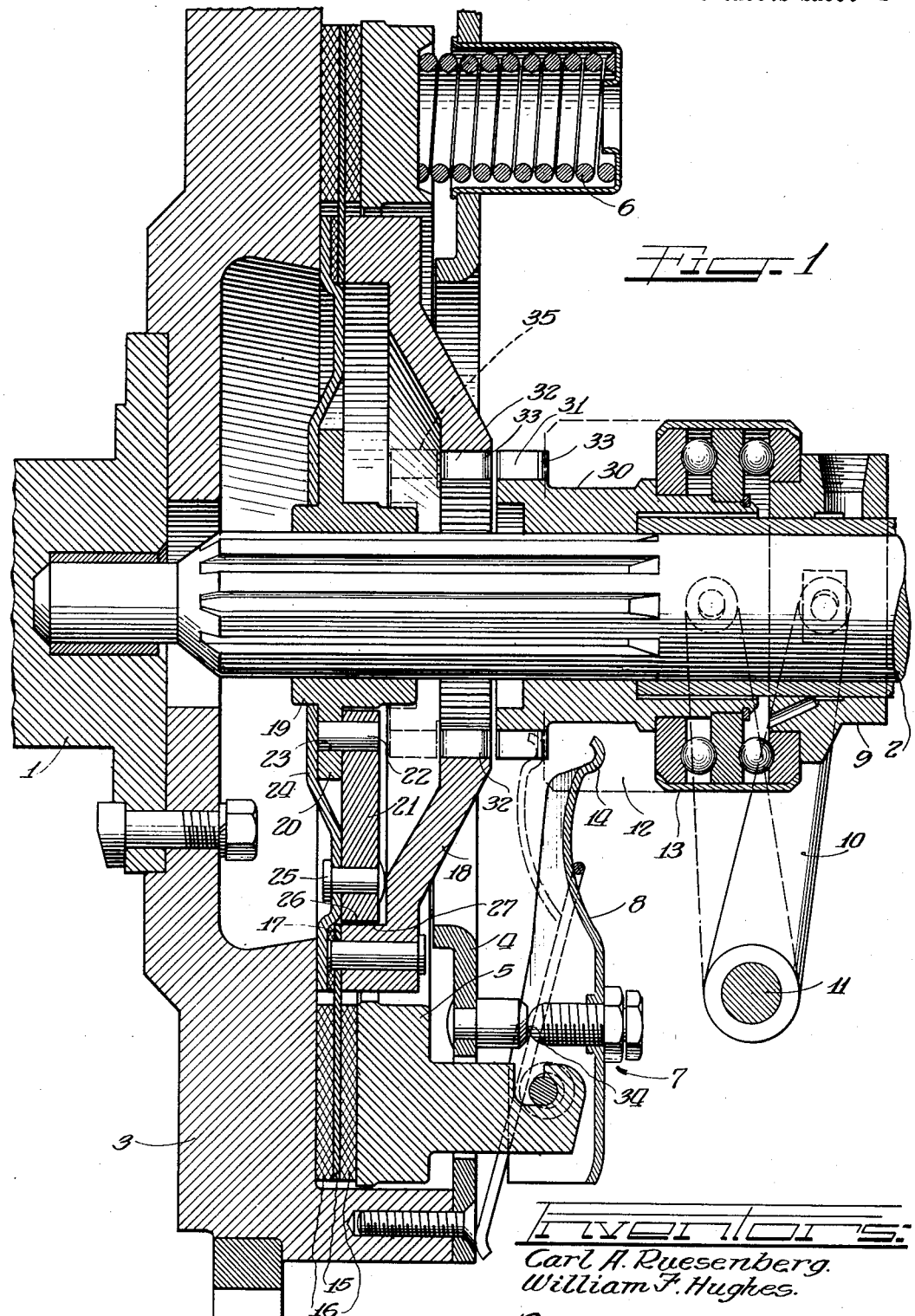
Figure 1 is a fragmentary central sectional view showing one embodiment of the invention.

Referring now more particularly to the drawings, wherein the same parts are indicated by the same reference characters, it is noted that the crank shaft 1 provides a bearing for the adjacent end of the spline shaft 2, the shaft 1 being bolted or otherwise securely fastened for rotation with the flywheel 3. A back plate 4 and pressure plate 5 of any suitable construction are associated with the flywheel 3 in the usual manner, the pressure plate being urged toward the flywheel by the usual springs 6. Suitable means for withdrawing the pressure plate 5 is indicated generally at 7, a plurality of such means being employed, having a lever 8 adapted to be actuated by a sleeve 9 through the medium of a control lever 10 mounted on the shaft 11 for pivotal movement in response to movement of the clutch pedal (not shown). The usual space 12 is provided between the thrust bearing 13 carried by the slidable sleeve 9 and the knob 14 on the lever 8 to take care of the play or lost motion which makes itself evident upon initially depressing the clutch pedal. The construction thus far described is well known and is not in and of itself an inventive feature of the instant disclosure.

The free wheeling clutch constructed in accordance with the principles of this invention consists of a clutch plate 15 on opposite sides of which suitable clutch composition facings 16 are secured. The portion of the plate 15 radially inward of the facings 16 is secured between an anti-friction gasket 17 and a dished disc 18. A hub 19 is splined on the shaft 2 substantially centrally of the disc 18 and is provided with a flange 20. Cams or cam elements 21 are joined by loose pivotal connections with the flange 20, each connection including a pin 22 securely fastened to a cam 21 and extending into an opening 23 in the flange 20 of the hub 19, said opening being larger than the pin 22 to afford lost motion therebetween. A cover plate or annulus 24 overlies the opening 23 on the side of the flange 20 opposite the cams 21 and also overlies the gasket 17, the plate at this point being so thin that it will not interfere with the action of the clutch.

Each cam 21 is pivotally connected to the cover plate 24 at 25, and is provided with a cam surface 26 of such formation that the cam itself constitutes in effect a bell crank lever, the free end or high portion 26a of which is adapted to tightly grip the interior annular surface 27 of the disc 18 when the cam is moved in one direction about the pivot 25, and to release its grip on the surface 27 when the cam is moved in the opposite direction about the pivot 25. The opening 23, in which the projecting end of the pin 22 is received, is so arranged that the cam 21 is capable of a slight pivotal movement about the pivot 25. The cams are arranged in a series between the hub 19 and the gripping surface 27. The cams are arranged in pairs, and a spring 28a is secured to one cam of each pair at 28 and engages in a slot in the adjacent portion of the other cam at 29. It will be noted that the pressure of the spring 28a urges both cam elements of each pair to rotate in the same direction (counter-clockwise as viewed in Figure 2) about their pivots 25, thereby urging the high portions 26a of the cam surfaces 26 into engagement with the annular surface 27.

Directing attention now to Figure 2, it will be apparent that when the engine clutch is in engaged position and the engine is driving the car, i. e., the flywheel tends to rotate at a faster rate than the shaft 2 on which the hub 19 is splined, the clutch will rotate as shown by the full line arrow at A, and the surface 27 of the disc will thereupon be tightly gripped by the cam surface 26 of each cam 21 and thereby force the shaft 2 to rotate therewith. However, as soon as the speed of the shaft 2 tends to exceed that of the flywheel 3, the torque applied on the inner end of each cam 21 by the hub flange 20, through the medium of the pin 22 and openings 23 will result in a pivotal movement of the cam about its pivot 25 in a direction to move the high portion 26a of the cam surface 26 away from the surface 27, such pivotal movement of the cam 21 being made possible by virtue of its loose pivotal connection with the flange 20 of the hub 19, so that said cam surfaces 26 will slip by the surface 27. It will thus be apparent that the construction afforded by the present invention provides for free wheeling of the vehicle.

The sleeve 9 is provided with an extension 30 having external teeth 31 adapted to interengage with the internal teeth 32 on the disc 18. The ends of the teeth are beveled at 33 to facilitate their interengagement. When the parts are arranged for free wheeling, the teeth 31 are close to the teeth 32 but are held out of engagement therewith by the usual clutch pedal spring, so that in order that the teeth may be interengaged, the clutch pedal (not shown) is depressed to cause the lever 10 to move the bearing 13 toward the end 14 of the lever 8. In causing this movement of the bearing 13 the usual play provided in the clutch pedal is taken up, so that the engine is directly connected, through interengagement of the teeth 31 and 32, with the shaft 2 to act as a brake therefor, while the engine clutch is still engaged. Thus a normal action on the part of the driver will result in the free wheeling device being locked out and the engine coupled with the shaft 2 to act as a brake, without in any way affecting the clutch engagement. When it is desired to disengage the clutch, it is necessary merely to further depress the clutch pedal, which is the usual action of the driver for this purpose, whereupon the levers 8 are pivoted at 34 to withdraw the pressure plate 5. During the further movement of the thrust bearing 13, to depress the levers 8, the teeth 31 are moved further toward the flywheel 3 until, when the clutch pedal is completely depressed, the teeth 31 will occupy a position shown in dotted lines at 35 in Figure 1. In this position, the teeth 31 are out of engagement with the teeth 32, although it is to be understood that if desired, the teeth may be so arranged as to be interengaged so long as the play in the clutch pedal is taken up.

It will be observed that inasmuch as the operator will naturally apply the foot brake to slow down the car, the effect of such action will be to reduce the speed of the driven shaft 2 so that when the teeth 31 and 32 are interengaged in response to the initial movement of the clutch pedal, the difference in speed of the teeth 31 and 32 will be reduced to such an extent as not to appreciably interfere with the interengagement with these teeth. This interengagement will take place substantially instantaneously, and, of course, will be facilitated by reason of the ends 33 of the teeth being beveled. Moreover, due to the frictional engagement of the engine clutch with the flywheel 3, should the difference in speed of the teeth 31 and 32 be excessive, the force applied by the foot pedal in moving the teeth into interengagement will result in a slipping of the clutch before any damage to the parts can occur. As mentioned, the further depression of the clutch pedal will cause the clutch to be disengaged so that the driver may shift the gearing of the transmission as he desires. Once this is done, the clutch may be released gradually in the usual way, and the teeth 31 will be caused to interengage with the teeth 32 without substantial resistance, so that with the clutch pedal thereafter depressed merely the amount sufficient to take up the usual play, the teeth 31 and 32 will still be intenganged so that the engine will act as a brake for the vehicle.

In Figures 3 and 4, we have shown a modification of the overrunning instrumentalities, wherein the hub 36, splined on the driven shaft (not shown) is provided with an annular groove 37 having concentric circular surfaces 38 and 39. Cams 40 are pivotally connected at 43 to the clutch plate 41 and the internally toothed dished disc 42, the openings in the cams 40 being enlarged to permit movement of the cam shoes 44, having the gripping portions 45 and 46, to shift somewhat relative to the surfaces 38 and 39 respectively. It will be noted that the gripping surfaces 45 and 46 on each shoe 44 are spaced apart a distance greater than the distance between the surfaces 38 and 39. Thus, when the clutch 47 is engaged with the flywheel and rotates in a direction shown by the arrow, and the engine is driving the vehicle, the tendency of the pivot pin 43 to move the outer portion 48 of the cam 40 with the clutch 47 is resisted by engagement of the portions 45 and 46 with the respective surfaces 38 and 39, said portions tightly gripping said surfaces and thereby causing the hub 36 to rotate with the clutch 47. When, however, the speed of the hub 36 on the spline shaft tends to exceed that of the flywheel and the clutch 47, the surfaces 38 and 39 of the hub will ride or slip by the portions 45 and 46. This is possible by reason of the fact that the cams 40 are loosely pivoted at 43 to permit the shoes 44 to tilt slightly with respect to the hub surfaces 38 and 39 to withdraw the portions 45 and 46 from engagement with said surfaces.

In a further form of the overrunning instrumentalities embodying the invention, cam instrumentalities are again employed. These include links 49 pivoted at 50 to the plate 51 of the clutch 52, and extending toward the center of the splined hub 53. Shoes 54, provided with arcuate surfaces 55 engaging arcuate portions 56 of the hub 53, are loosely and pivotally connected at 57 to the links 49. Each shoe 54 is bifurcated at its pivotal connection, and the inner end portion 58 of the link 49 is adapted for abutment with a surface 59 on the shoe 54. The portion 58 of each link 49 is eccentric with respect to the pivot 57, so that upon a tendency of the link 49 to turn about the pivot 50 in one direction, the portion 58 will be forced tightly against the surface 59 of the shoe 54, to thereby force the shoe surface 55 into gripping engagement with the hub surface 56 and thereby cause the hub 53 to move with the clutch 52. It will be apparent upon an inspection of Figure 5 that this action is brought about upon the tendency of the clutch 52, when engaged with the flywheel (not shown in this view) to move in the direction shown by the arrow at a greater speed than the shaft on which the hub 53 is splined. When, however, the speed of the splined shaft tends to exceed that of the clutch 52, i. e., due to the vehicle being moved solely by its momentum, it will be apparent that the effect of such tendency will be to move the eccentric portion 58 away from the surface 59 of the shoe 54, so that the surfaces 55 and 56 will slip by each other and thereby permit the splined shaft and hub 53 to move independently of the clutch 52.

The loose pivotal connections of the various cam elements, in addition to making possible the simultaneous gripping and releasing of associated surfaces by said elements, also obviates the necessity of highly accurate machine work on the elements. Thus overrunning devices of the character herein disclosed may be made at a low cost of manufacture and may be readily assembled.

It will, of course, be understood that in the various modifications of the clutch instrumentalities the cam devices may be arranged to grip either the hub or the disc to effect the same result as the constructions herein disclosed accomplish. Moreover, while the means for locking the free wheeling device employs a splined sleeve with external teeth for interengagement with the internal teeth of the disc, the arrangement of the teeth on these members may also be reversed without departing from the scope of the invention.

It will be seen from the foregoing that with the construction employed herein, it is possible to lock out the free wheeling device without substantially jarring or shocking the car and associated instrumentalities of the locking and other mechanism. Moreover, it will be observed that the action of locking out the free wheeling instrumentalities is a normal one on the part of the driver, so that all his faculties may be concentrated on the operation of slowing down and steering the car, his hands being entirely free to direct the vehicle and apply the emergency brake if necessary.

We are aware that many changes may be made, and numerous details of construction may be varied through a wide range without departing from the principles of this invention, and we therefore, do not purpose limiting the patent granted hereon, otherwise than necessitated by the prior art.

We claim as our invention:

1. An overrunning clutch comprising a driving part, a driven part, one of said parts having a peripheral surface, a link pivoted to one of said parts, a shoe engaging said surface, and loosely pivoted to said link, said link having a cam portion engageable with said shoe to force the latter against said surface when the driving part tends to move faster than the driven part.

2. An overrunning connection comprising a driving part, a driven part, an annulus, a plurality of gripping members pivoted to said annulus, intermediate said parts, each member having one end loosely pivoted to one of said parts and the other end including a gripping surface engageable with the other part to limit pivotal movement of said member, said members being operable to grip said other part only upon said driving part tending to move at a greater rate of speed than the driven part, and resilient means to facilitate gripping engagement between said members and said other part, said means comprising a spring interposed between each pair of members and urging said surfaces toward said other part.

3. A driven element, an overrunning clutch carried thereby, a drive element engaged with the clutch, and means operable upon movement in one direction to progressively prevent overrunning of said clutch and disengage the same from the drive element.

4. A drive shaft, a driven shaft, an overrunning clutch comprising a hub splined on said driven shaft and a rim normally drivably engaged with said drive shaft, a sleeve splined on said driven shaft, said sleeve and said rim having interlockable portions, means for shifting said sleeve into interlocking engagement with said rim and thereby prevent overrunning of said clutch, mechanism for disengaging said rim, and a member carried by said sleeve and operable by said means to actuate said mechanism.

5. A drive shaft, a driven shaft, an overrunning clutch comprising a hub splined on said driven shaft and a rim normally drivably engaged with said drive shaft, a sleeve splined on said driven shaft, said sleeve and said rim having interlockable portions, means comprising a device operated by a foot of the driver for shifting said sleeve into interlocking engagement with said rim and thereby prevent overrunning of said clutch, mechanism for disengaging said rim, and a member carried by said sleeve and operable by said means to actuate said mechanism.

6. A drive shaft, a driven shaft, an overrunning clutch comprising a hub splined on said driven shaft and a rim normally drivably engaged with said drive shaft, a sleeve splined on said driven shaft, said sleeve and said rim having interlockable portions, means for shifting said sleeve into interlocking engagement with said rim and thereby prevent-overrunning of said clutch, mechanism for disengaging said rim, and a member carried by said sleeve and operable by said means to actuate said mechanism, said portions being interlockable before said member operates said mechanism, whereby said means acts successively as a speed arresting and a clutch disengaging instrumentality.

7. A drive element, a clutch including overrunning parts and normally drivably engaged with said drive element, a driven element, one of said parts being drivably associated with the driven element, a member splined on said driven element, said member and the other of said parts being provided with normally disengaged interlockable portions, mechanism for disengaging said clutch, means movable with said member for actuating said mechanism, said means being spaced from said mechanism so that said portions may be interlocked prior to actuation of said mechanism by said means, said portions becoming disengaged upon further movement of said means to disengage said clutch.

8. A drive element, a clutch including overrunning parts and normally drivably engaged with said drive element, a driven element, one of said parts being drivably associated with the driven element, a member splined on said driven element, said member and the other of said parts being provided with normally disengaged interlockable portions, mechanism for disengaging said clutch, means movable with said member for actuating said mechanism, said means being spaced from said mechanism so that said portions may be interlocked prior to actuation of said mechanism by said means, said portions becoming disengaged upon further movement of said means to disengage said clutch, said interlockable portions being constructed to facilitate their interengagement.

9. A drive shaft, a driven shaft, an overrunning clutch comprising a hub on said driven shaft and a rim normally drivably engaged with said drive shaft, a sleeve splined on said driven shaft, said sleeve and said rim having interlockable portions, and means for shifting said sleeve into interlocking association with said rim without disengaging said rim and thereafter unlocking said portions and disengaging said rim.

10. A drive shaft, a driven shaft, a clutch for said shafts, said clutch including overrunning parts, one of which is splined on the driven shaft and the other of which is normally drivably engaged with said drive shaft, mechanism operable to disengage said other part, a sleeve splined on said driven shaft, said sleeve and said other part having interlockable portions, and means movable with said sleeve for actuating said mechanism, sleeve being slidable along said driven shaft in one direction to cause said portions to interlock and subsequently actuate said mechanism and cause said portions to unlock, and in the opposite direction to cause said portions to interlock and at the same time allow reengagement of said other part and subsequently to unlock said portions.

11. In a motor vehicle power transmission system including normally drivably connected drive and driven shafts and a disconnecting mechanism operable by the driver in direct response to a positive normal driving act of the driver to disconnect the shafts: an overrunning clutch carried by the driven shaft independently of the drive shaft and through which the shafts are normally connected for a one-way drive, and normally ineffective means for preventing overrunning of the clutch and arranged so as to be effective before the shafts are disconnected, said means including a part movable with the disconnecting mechanism and effective in response to the same act of the driver.

12. In a motor vehicle power transmission system including normally drivably connected drive and driven shafts and a disconnecting mechanism operable by the driver in direct response to a positive normal driving act of the driver to disconnect the shafts: an overrunning clutch carried by one of the shafts independently of the other shaft and through which the shafts are normally connected for a one-way drive, and normally ineffective means for preventing overrunning of the clutch and arranged so as to be effective before the shafts are disconnected, said means including a part movable with the disconnecting mechanism and effective in response to the same act of the driver.

CARL A. RUESENBERG.
WILLIAM F. HUGHES.